United States Patent [19]

Kennedy et al.

[11] 4,213,129
[45] Jul. 15, 1980

[54] DELAY STABILIZING SYSTEM

[75] Inventors: Howard L. Kennedy, Scottsdale; Keith M. Kingsbury, Tempe, both of Ariz.

[73] Assignee: Motorola Inc., Schaumburg, Ill.

[21] Appl. No.: 960,255

[22] Filed: Nov. 13, 1978

[51] Int. Cl.² .............................................. G01S 9/56
[52] U.S. Cl. .......................... 343/6.8 R; 343/6.8 LC; 343/7 AG
[58] Field of Search ........... 343/6.8 R, 6.8 LC, 7 AG

[56] References Cited

U.S. PATENT DOCUMENTS

| | | | |
|---|---|---|---|
| 2,728,852 | 12/1955 | Moran, Jr. | 343/6.8 R |
| 3,504,366 | 3/1970 | Tolles et al. | 343/6.8 R |
| 4,047,171 | 9/1977 | Fugit | 343/6.8 R |
| 4,050,070 | 9/1977 | Beno et al. | 343/6.8 LC |

Primary Examiner—S. C. Buczinski
Attorney, Agent, or Firm—M. David Shapiro; Eugene A. Parsons

[57] ABSTRACT

A system for stabilizing the amplitude and, thus, the delay of a signal pulse subsequent to the first interrogating signal pulse to a transponder used in a range measurement system. AGC level in the transponder is set responsive to the first interrogating pulse and is held for a time period encompassing the subsequent pulse.

9 Claims, 6 Drawing Figures

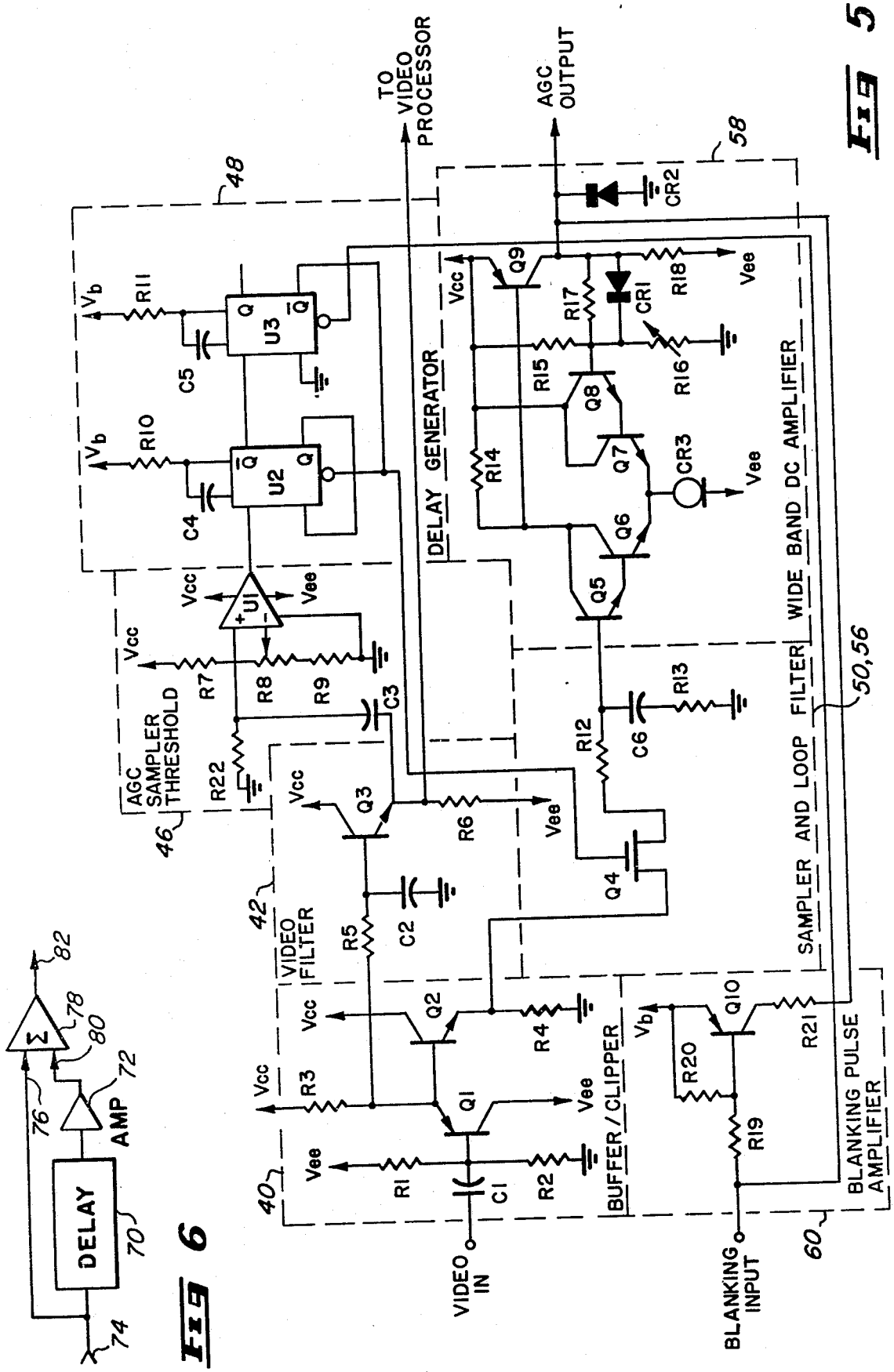

DELAY STABILIZING SYSTEM

FIELD OF THE INVENTION

The invention relates to a system for stabilizing the delay time through a transponder thereby yielding more accurate measurements of range to the transponder.

BACKGROUND OF THE INVENTION

One of the primary factors contributing to ranging inaccuracies in radar transponders or beacons is the variation in transponder delay with changes in input signal strength. The change in delay results from the transponder responding to the input signal at different points on the leading edge as the input signal amplitude changes. This occurs because of finite rise times and fixed thresholds of the signal detection circuits. The effect is illustrated in FIG. 1. Smaller signal 10 has threshold point 12 while larger signal 14 has threshold point 16 based on the threshold level being set at line 18. Time differential 20 is denoted as $\Delta t$. It may readily be seen then that $\Delta t$ is a function of amplitude of the input signal.

In the past, use of slow automatic gain control (AGC) systems and the use of a delay stabilizer in conjunction with a Linear-logarithmic IF amplifier has been used to minimize this effect. However, slow AGC is objectionable in many applications. In a situation where the transponder is being interrogated by more than one tracking radar, the strongest received signal captures the receiver and the weaker signals will not produce any stabilized output. The logarithmic IF amplifier and delay stabilizer overcome this objection, but the precision of the circuit is limited to the ability of the IF amplifier to produce an output that is truly the logarithm of the input.

SUMMARY OF THE INVENTION

The foregoing and other shortcomings and problems of the prior art are overcome, in accordance with the present invention, by utilizing an AGC circuit which senses the amplitude of a first incoming pulse and provides a constant output amplitude of a second input pulse in response to the sensing of the amplitude of the first input pulse. Amplitude control is accomplished by means of a broad band attenuator which avoids changing the shape of the input signals. The resultant constant amplitude output signal is coupled to a threshold device such as a differencing circuit or a voltage comparator such that it will be detected by the comparator at the same time regardless of the input signal level. The amplitude stabilization of the input signal eliminates or much reduces the delay variations as a function of signal amplitude.

It is therefore an object of the invention to reduce delay variations in a transponder by means of a stabilized amplitude signal.

It is another object of the invention to provide a delay stabilized response from a transponder thereby improving range accuracy in a ranging system comprising a radar set and the transponder.

It is still another object of the invention to synthesize a second pulse within a transponder in response to a single interrogating pulse from a radar system, the amplitude of the second pulse being stabilized with respect to the amplitude of the first pulse by means of an AGC system responsive only to the first pulse.

It is yet another object of the invention to provide a stabilized delay for a second synthesized pulse in a transponder which is responsive to a single interrogating pulse derived from a radar system thereby improving range accuracy of the radar measurements.

These and other objects of the invention will become more clear upon consideration of the Detailed Description of the Invention and the drawings in which:

FIG. 1 is a graphic representation of the comparison of delay between a relatively low amplitude signal and a relatively high amplitude signal, FIG. 2 is a block diagram of a radar transponder showing one method of implementing a delay stabilizing system according to the invention, FIG. 3 is a detailed block diagram of the AGC circuit of FIG. 2, FIG. 4 is a timing diagram for the signals of FIG. 3, FIG. 5 is a detailed schematic diagram of the AGC circuit of FIG. 3, and FIG. 6 is a block diagram showing one method of generating a second pulse within a transponder.

DETAILED DESCRIPTION OF THE INVENTION

Figure 1:
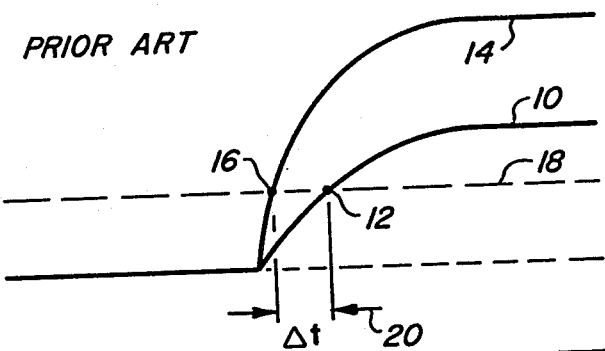
Figure 2:
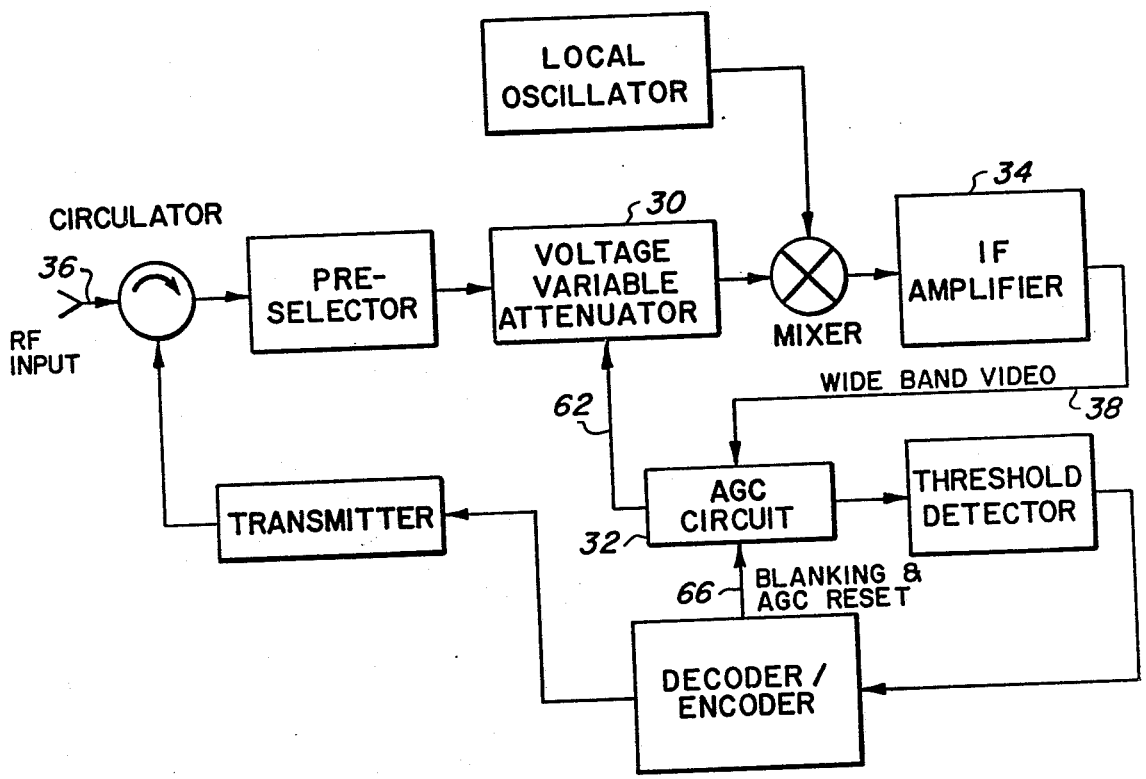

FIG. 2 shows one possible means of integrating a delay stabilizing system into a transponder. The two blocks which have been added to a transponder typical of those in the prior art are voltage variable attenuator 30 and AGC circuit 32. Although the use of a voltage controlled attenuator 30, such as a PIN diode attenuator, is shown; in some applications the gain of IF amplifier 34 could be controlled with similar effect. Wideband video signals are coupled out of IF amplifier 34 to buffer amplifier 40 (shown in FIG. 3), part of AGC circuit 32. Buffer amplifier 40 (still referring to FIG. 3) drives low pass filter 42 which establishes the bandwidth used for video processing. This filtered output is fed to threshold detector 44 and is also coupled into voltage comparator 46 which establishes the AGC sampler threshold. When the video amplitude exceeds the sampler threshold, delay generator 48 is triggered generating a pulse delayed with respect to the video input. This delayed pulse opens sampler switch 50 for a predetermined time or until a reset pulse is generated. Delay generator 48 could be triggered by the standard pulse output of the video processor, making its trigger threshold the same as the beacon trigger threshold, thus reducing the amount of circuitry required. This possibility is indicated by broken line connection 52 between threshold detector 44 and delay generator 48. Buffer amplifier 40 output is also coupled to bottom clipper or differencing amplifier 54 which sets the AGC threshold (the signal level at which amplitude stabilization begins). Whenever the video amplitude exceeds the AGC threshold voltage the difference voltage is coupled through normally closed sampling switch 50, which may be an electronic switch, and then into loop filter 56. Filter 56 establishes the AGC loop bandwidth and acts as a memory when switch 50 is open. Filter 56 output is coupled to wideband amplifier 58 having a high input impedance so that the charge on the filter capacitor of filter 56 doesn't decay significantly between pulse pairs. Amplifier 58 is also designed to drive PIN diode attenuator 30 (FIG. 2). After the AGC voltage has had time to settle during the first pulse, sampling switch 50 is opened by the output of delay generator 48. Loop filter 56 capacitor maintains the input voltage required by buffer amplifier 58 to correctly bias PIN diodes 30

(FIG. 2) for the second pulse. The second pulse then generates a delay stabilized output pulse from threshold detector 44 which can be used to initiate the transponder reply. In the process of generating a reply pulse, a blanking pulse is normally generated to prevent the transponder from responding to its own reply or to protect the receiver during its reply. Following the blanking pulse, since all timing has been established, the receiver may be returned to full sensitivity. This is accomplished by resetting delay generator 48 thus allowing sampler switch 50 to close. Although not shown, circuit recovery could be speeded up further by an active dump for loop filter 56 capacitor.

Of course, it will be understood that ranging is accomplished by measurement of elapsed time from transmission of the second radar pulse to reception, at the radar, of the second transponder pulse. As is usual in this sort of system, the elapsed time measurement must be corrected by the known delay, inherent in the transponder.

FIG. 5 shows a schematic diagram for the AGC portion of the delay stabilizer system. The wideband video signal from IF amplifier 34 (FIG. 2) is coupled through capacitor C1 to Q1 which acts as a buffer amplifier. Q1 output, taken from its emitter, is coupled to the low pass video filter formed by R5, C2, and Q3. It is also coupled to the base of Q2 whose base emitter junction is back biased by the voltage developed by the voltage divider action of R1 and R2 offset by the base emitter voltage of Q1 providing a temperature compensated threshold. Video signals whose amplitude exceeds this threshold (the AGC threshold) are coupled to the sampling switch, field effect transistor Q4.

Sampling switch Q4 is normally closed, therefore, any video signals coupled to it are passed and applied to loop filter R12, C6 and R13. The output of the loop filter is coupled to the input of wideband DC amplifier Q5, Q6, Q7, Q8 and Q9 and their associated components. The output of Q9 supplies current and voltage to the pin diode causing the input signal to be attenuated until the video output amplitude approaches the AGC threshold voltage where its amplitude stabilizes. Stabilization of the amplitude takes time, therefore the leading edge of the first video pulse of the pair will have a spike on it. The DC amplifier is biased so that under conditions of no AGC the attenuator will be set at minimum attenuation; yet requires as little voltage change at its output as possible before providing attenuation. If the voltage out of Q9 must change very far to obtain attenuation, additional time is required, thus slowing up circuit response. To help speed up the attack time, feedback is applied to the base of Q8 via R17 and CR1. This allows the amplifier gain to be higher for negative polarities (zero attenuation) than for positive outputs. Diode CR2 prevents the output from being more negative than one diode drop. The output of Q3 is coupled to the input of voltage comparator U1, which may be a differential or operational amplifier. The inverting input to the comparator is set to the desired sampling threshold. Video signals that exceed this threshold trip the comparator whose output then triggers the delay generator, U2 and U3. The delay generator consists of two cascaded monostable multi-vibrators that are connected in such a manner that their combined timing cycles must be complete before they can be retriggered. The second monostable, U3, is triggered at the end of the timing cycle of U2. The delay generated is then determined by R10 and C4 of U1 and the period the sampler will remain open is determined by R11 and C5 associated with U3. If the received signal is decoded, a blanking pulse is applied to the base of Q10 via R19 resulting in maximum attenuation to the transmitter pulse. The same pulse can be used to reset the delay generator prior to its completion of a full timing cycle to speed up receiver recovery.

Figure 3:
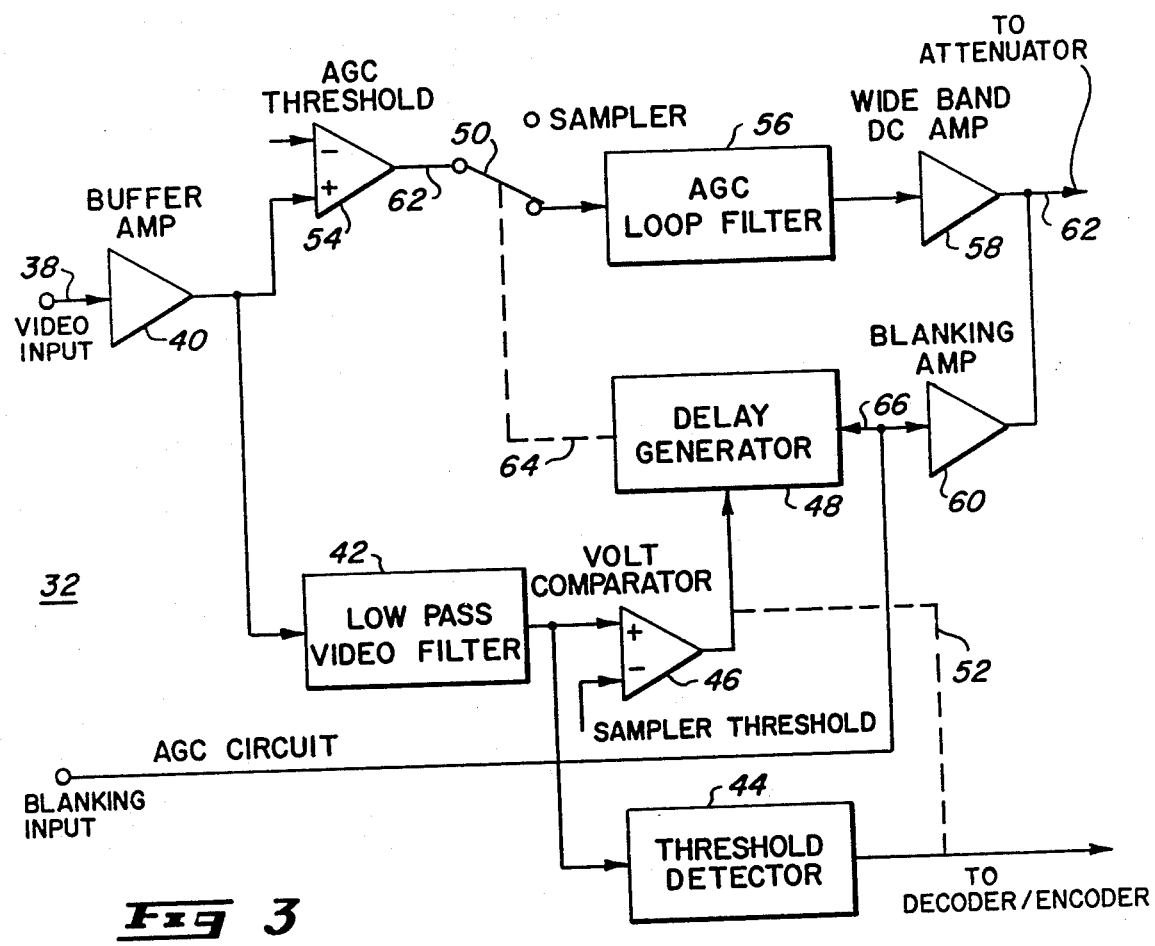
Figure 4:
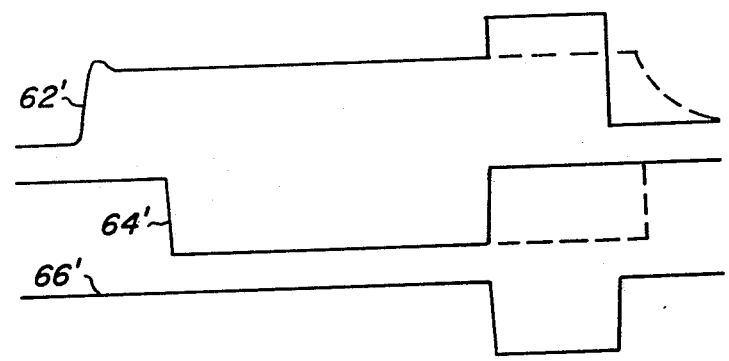

The operation of the circuits may be better understood by observation of typical waveforms which may be observed therein. In the explanation which follows it will be understood that unprimed reference numerals appearing in FIGS. 2 and 3 are indicative of the circuit locations of waveforms with like primed reference numerals to be found in FIG. 4. This arrangement will facilitate the readers understanding of the relationship of circuit to waveform. Waveform 36' is typical of an input RF signal envelope which may appear at 36 of FIG. 2. Of course, in a system utilizing only one radar pulse, only one pulse would appear in 36'. Waveform 38' of FIG. 4 is typical of the wideband video output at point 38, FIG. 2 the output of IF amplifier 34. The leading edge spike on the first pulse is representative of the AGC attack time. Point 38 also appears in FIG. 3. Waveform 62' represents the output of wideband DC amplifier 58 of FIG. 3. Waveform 64' represents delay generator 48 output (see FIG. 3) and the broken line in waveform 64' indicates the situation in which no AGC reset or blanking is generated. Waveform 66' represents the blanking pulse, see FIGS. 2 and 3.

As before mentioned, the radar system which is used with the transponder as described may generate two output pulses for each repetition rate period. However, alternatively, the second pulse may be synthesized within the transponder of the invention. This may be accomplished according to FIG. 6 where it may be seen that delay device 70 and amplifier 72 comprise a unity amplifier incorporating a predetermined fixed delay. The amount of delay will be equivalent to the normal delay in a dual pulse radar system, that is the delay between pulses. The radar pulse is introduced at terminal 74 thereby producing an undelayed pulse at terminal 76 of gate 78 and a delayed pulse at terminal 80 of gate 78. Gate 78 may be a summing circuit providing the composite two pulse signal at output terminal 82. The circuit of FIG. 6 may be imposed between IF amplifier 34 and AGC circuit 32 in the conductor 38 as shown in FIG. 2. This sort of an arrangement provides a two pulse system within the transponder where only a single pulse is available from the cooperating radar system. It should be understood that in the alternative system, just described, it is necessary to correct the elapsed time measurement in the radar by consideration of the added delay between the input pulse to the transponder and the synthesized second pulse. This completes the operational description of the invention.

While the invention has been particularly shown and described with reference to a preferred embodiment thereof, it will be understood by those skilled in the art that various other modifications and changes may be made to the present invention from the principles of the invention described above without departing from the spirit and scope thereof, as encompassed in the accompanying claims. Therefore, it is intended in the appended claims to cover all such equivalent variations as come within the scope of the invention as described.

What is claimed is:

1. A method for stabilizing delay of a second pulse in a transponder when a first pulse of equal amplitude to that of the second pulse and the second pulse are sequentially present in at least a single pulse train in a receiver of the transponder, the method comprising the steps of:

measuring the amplitude of the first pulse in the receiver of the transponder;

controlling gain of the receiver as a function of said measured amplitude, said gain being held constant over a period of time including said second pulse;

detecting a preset threshold level of only the second pulse at an output of said receiver; and triggering a transmitted signal from the transponder responsive to said threshold detection.

2. The method according to claim 1 wherein each of the pulse trains is derived from a single input pulse and further comprises the step of:

generating the second pulse within the receiver.

3. The method according to claim 2 wherein said generating step further comprises:

a unity gain delay circuit, said unity gain delay circuit having an input driven by the first pulse.

4. The method according to claim 1 further comprising the steps of:

delaying the first pulse in the receiver in a delay circuit, the delay circuit having a gain equal to one, the second pulse being produced at the output of said delay circuit.

5. The method according to claim 1, 2, 3 or 4 wherein the second pulse is generated by passing the first pulse through a surface acoustic wave device and an amplifier, the second pulse having an amplitude equal to the first pulse.

6. In a range measurement system comprising a radar and a transponder wherein the transponder is interrogated by a series of pulse trains from the radar, each of the pulse trains comprising at least a first pulse having an amplitude, an improvement in the transponder comprising in combination:

means for sensing the amplitude of the first pulse of each of said series of pulse trains;

means for controlling the gain of a receiver in the transponder, said controlling means being responsive to said sensed amplitude of the first pulse, to establish a constant output signal amplitude from the receiver for a period of time, said period of time encompassing the introduction and passage of at least one subsequent pulse in the receiver to stabilize delay of said at least one subsequent pulse in the receiver.

7. The system according to claim 6 wherein the series of pulse trains each comprise a single pulse, the improvement further comprising:

means for delaying said single pulse and for synthesizing said at least one subsequent pulse within the transponder.

8. The system according to claim 6 or 7 wherein said gain controlling means comprises a voltage controlled attenuator.

9. The system according to claim 7 wherein said delaying means comprises a surface acoustic wave device.

* * * * *

UNITED STATES PATENT AND TRADEMARK OFFICE
CERTIFICATE OF CORRECTION

PATENT NO. : 4,213,129
DATED : Jul. 15, 1980
INVENTOR(S) : Howard L. Kennedy et al.

It is certified that error appears in the above-identified patent and that said Letters Patent are hereby corrected as shown below:

In item [75], first line on the title page, change "Scottsdale" to --Phoenix--.

Signed and Sealed this

Twenty-third Day of December 1980

|SEAL|

Attest:

SIDNEY A. DIAMOND

Attesting Officer

Commissioner of Patents and Trademark